United States Patent
McCartney et al.

(10) Patent No.: US 10,208,477 B2
(45) Date of Patent: Feb. 19, 2019

(54) VEIL FINISHING PROCESS

(71) Applicant: USG INTERIORS, LLC, Chicago, IL (US)

(72) Inventors: Nicholas McCartney, Harwood Heights, IL (US); Jeffrey W. Donelan, Highland Park, IL (US)

(73) Assignee: USG INTERIORS, LLC, Chicago, IL (US)

( * ) Notice: Subject to any disclaimer, the term of this patent is extended or adjusted under 35 U.S.C. 154(b) by 27 days.

(21) Appl. No.: 15/299,403

(22) Filed: Oct. 20, 2016

(65) Prior Publication Data
US 2018/0112402 A1    Apr. 26, 2018

(51) Int. Cl.
| | |
|---|---|
| *E04B 9/04* | (2006.01) |
| *B32B 5/02* | (2006.01) |
| *D04H 3/004* | (2012.01) |
| *D06N 5/00* | (2006.01) |
| *G10K 11/168* | (2006.01) |
| *B32B 5/26* | (2006.01) |
| *E04F 13/075* | (2006.01) |
| *E04F 13/077* | (2006.01) |

(52) U.S. Cl.
CPC .............. *E04B 9/045* (2013.01); *B32B 5/022* (2013.01); *B32B 5/26* (2013.01); *D04H 3/004* (2013.01); *D06N 5/00* (2013.01); *G10K 11/168* (2013.01); *B32B 2305/026* (2013.01); *B32B 2315/085* (2013.01); *E04F 13/075* (2013.01); *E04F 13/077* (2013.01)

(58) Field of Classification Search
CPC .................................................... E04B 9/0464
USPC ................................. 181/290, 291, 293, 294
See application file for complete search history.

(56) References Cited

U.S. PATENT DOCUMENTS

| | | | |
|---|---|---|---|
| 1,769,519 A | 7/1930 | King et al. | |
| 2,020,403 A | 11/1935 | Engle | |
| 2,962,385 A * | 11/1960 | Rees ........................ | B05D 1/28 118/206 |
| 3,246,063 A | 4/1966 | Podgurski | |

(Continued)

FOREIGN PATENT DOCUMENTS

| | | |
|---|---|---|
| CN | 103145342 A | 6/2013 |
| EP | 0194371 A1 | 9/1986 |

(Continued)

OTHER PUBLICATIONS

"Bonding and Coating Applications of PQ® Soluble Silicates" brochure, Industrial Chemicals Division, PQ Corporation, 7 pp. (2006).

(Continued)

*Primary Examiner* — Jeremy A Luks
(74) *Attorney, Agent, or Firm* — Marshall, Gerstein & Borun LLP

(57) ABSTRACT

The disclosure provides a fibrous panel including a basemat and a porous veil disposed on at least one side of the basemat, the veil having a first surface in contact with the one side of the basemat and a second facing surface opposite the first surface, the veil having a patterned coating disposed on the second facing surface, the patterned coating including defined areas without any coating and defined areas with at least a single layer of coating. The disclosure further provides a method of making a fibrous panel according to the disclosure.

15 Claims, 1 Drawing Sheet

(56) References Cited

U.S. PATENT DOCUMENTS

| | | | |
|---|---|---|---|
| 3,307,651 A | 3/1967 | Podgurski | |
| 3,426,063 A | 2/1969 | Gros | |
| 3,445,257 A | 5/1969 | Hloch | |
| 3,802,386 A | 4/1974 | Wendlandt et al. | |
| 3,908,059 A * | 9/1975 | Prince | E04B 9/04 427/198 |
| 3,930,876 A | 1/1976 | Nakajima et al. | |
| 4,097,635 A * | 6/1978 | Sanz Hernandez | B05D 5/06 106/31.86 |
| 4,288,252 A | 9/1981 | Neely | |
| 4,328,019 A | 5/1982 | Dejaiffe et al. | |
| 4,541,854 A | 9/1985 | Schonhaar et al. | |
| 4,720,295 A | 1/1988 | Bronshtein | |
| 4,818,595 A | 4/1989 | Ellis | |
| 4,911,788 A | 3/1990 | Pittman et al. | |
| RE33,773 E | 12/1991 | Guerro et al. | |
| 5,250,153 A | 10/1993 | Izard et al. | |
| 5,332,699 A | 7/1994 | Olds et al. | |
| 5,472,917 A | 12/1995 | Talling et al. | |
| 5,496,392 A | 3/1996 | Sims et al. | |
| 5,558,710 A | 9/1996 | Baig | |
| 5,614,449 A | 3/1997 | Jensen | |
| 5,674,594 A * | 10/1997 | Sensenig | B05D 7/06 106/795 |
| 5,709,728 A | 1/1998 | Fleckenstein et al. | |
| 5,750,255 A | 5/1998 | Yoshida et al. | |
| 5,776,392 A | 7/1998 | Schmuck | |
| 5,874,161 A * | 2/1999 | Pape | B27N 7/005 106/816 |
| 5,911,818 A | 6/1999 | Baig | |
| 6,077,798 A | 6/2000 | Rapp | |
| 6,171,388 B1 | 1/2001 | Jobbins | |
| 6,265,335 B1 | 7/2001 | Oleske et al. | |
| 6,284,351 B1 * | 9/2001 | Sensenig | B32B 5/26 428/206 |
| 6,305,495 B1 | 10/2001 | Keegan | |
| 6,428,616 B1 | 8/2002 | Neely, Jr. | |
| 6,443,256 B1 | 9/2002 | Baig | |
| 6,443,257 B1 * | 9/2002 | Wiker | B32B 29/00 181/290 |
| 6,443,258 B1 | 9/2002 | Putt et al. | |
| 6,893,752 B2 | 5/2005 | Veeramasuneni et al. | |
| 6,897,173 B2 | 5/2005 | Bernard et al. | |
| 6,919,132 B2 | 7/2005 | Felegi, Jr. et al. | |
| 7,033,963 B2 * | 4/2006 | Felegi, Jr. | C09D 5/028 181/286 |
| 7,056,460 B2 | 6/2006 | Englert | |
| 7,351,469 B2 * | 4/2008 | Beck | B05D 5/00 401/6 |
| 7,364,015 B2 | 4/2008 | Englert et al. | |
| 7,851,052 B2 | 12/2010 | Caldwell | |
| 8,133,357 B2 | 3/2012 | Cao et al. | |
| 8,536,259 B2 | 9/2013 | Carbo et al. | |
| 8,603,231 B2 | 12/2013 | Wagh et al. | |
| 8,697,588 B2 | 4/2014 | Brown | |
| 8,967,823 B2 | 3/2015 | D'Antonio | |
| 9,073,780 B2 | 7/2015 | Schinkinger et al. | |
| 9,076,428 B2 | 7/2015 | Kipp et al. | |
| 9,382,153 B2 | 7/2016 | Fisher et al. | |
| 2004/0039098 A1 | 2/2004 | Belmares et al. | |
| 2004/0121075 A1 * | 6/2004 | Grove, III | B44C 3/00 427/256 |
| 2004/0197468 A1 * | 10/2004 | Geel | B44C 3/00 427/180 |
| 2005/0249924 A1 * | 11/2005 | Reichwein | B41J 3/407 428/195.1 |
| 2007/0055012 A1 | 3/2007 | Caldwell | |
| 2007/0277948 A1 | 12/2007 | Carbo et al. | |
| 2009/0126886 A1 * | 5/2009 | Englert | D21H 11/20 162/151 |
| 2009/0260770 A1 * | 10/2009 | Cao | C04B 18/24 162/202 |
| 2011/0076470 A1 * | 3/2011 | Zaveri | B32B 5/18 428/196 |
| 2011/0147119 A1 | 6/2011 | Cao et al. | |
| 2011/0262721 A1 | 10/2011 | Albertelli et al. | |
| 2013/0330486 A1 * | 12/2013 | Shields | B44F 1/10 428/29 |
| 2013/0334726 A1 | 12/2013 | Hernandez-Torres et al. | |
| 2014/0000981 A1 * | 1/2014 | Silfverhuth | E04B 1/82 181/290 |
| 2014/0124291 A1 | 5/2014 | Dugan et al. | |
| 2015/0308111 A1 | 10/2015 | Kemp et al. | |
| 2015/0330072 A1 * | 11/2015 | Kragness | E04B 1/84 181/290 |
| 2016/0032583 A1 | 2/2016 | Xu et al. | |
| 2016/0131299 A1 | 5/2016 | Mueller et al. | |

FOREIGN PATENT DOCUMENTS

| | | |
|---|---|---|
| EP | 0639678 A2 | 2/1995 |
| WO | WO-2010/114626 A1 | 10/2010 |

OTHER PUBLICATIONS

"Sodium and Potassium Silicates: Versatile Compounds for Your Applications" brochure, PQ Europe, 16 pp. (Oct. 2004).

"Soluble Silicates in Geotechnical Grouting Applications", Bulletin 52-53, Industrial Chemicals Division, PQ Corporation, 6 pp. (2003).

McDonald et al., Recent Developments in Soluble Silicate Based Binders and Coatings, 10 pp.

McDonald et al., Sodium Silicate a Binder for the 21st Century, Industrial Chemicals Division, The PQ Corporation, 6 pp.

Rabbii, Sodium silicate glass as an inorganic binder in foundry industry, Iranian Polymer J., 10(4):229-35 (2001).

International Application No. PCT/US2017/056882, International Search Report and Written Opinion, dated Dec. 14, 2017.

* cited by examiner

VEIL FINISHING PROCESS

FIELD OF THE INVENTION

The disclosure relates generally to a process for improved veil finishing. More particularly, the disclosure relates to a printing process for improved veil finishing and a fibrous panel having a basemat with a veil, the veil having a patterned coating thereon.

BACKGROUND

Fibrous panels, such as ceiling tiles and acoustical panels, are generally laminate structures comprising a basemat with a non-woven glass or glass blended veil to provide improved structural and acoustical performance. Additionally, the veil provides a uniform and flat appearance that is often desired in current interior design trends. To achieve the desired light reflectance properties and overall white appearance, the veil is painted with a sprayed coating. This coating is sprayed in multiple layers to provide a non-overlapping finish having uncoated areas which allows sufficient acoustical transmission into and through the tile. However, the spraying process results in a non-uniform layer that can present issues with a continuous production operation, including non-reproducible aesthetic finishes and wasted coating material.

SUMMARY

One aspect of the disclosure provides a fibrous panel including a basemat and a porous veil disposed on at least one side of the basemat, the veil having a first surface in contact with the one side of the basemat and a second facing surface opposite the first surface, wherein a patterned coating including defined areas without any coating and defined areas with at least a single layer of coating is disposed on the second facing surface of the veil.

Another aspect of the disclosure provides a method of making a fibrous panel according to the disclosure, comprising providing a fibrous panel including a basemat and a porous veil disposed on at least one side of the basemat, the veil having a first surface in contact with the one side of the basemat and a second facing surface opposite the first surface, and printing a patterned coating on the second facing surface of the veil, wherein the patterned coating includes defined areas without any coating and defined areas with at least a single layer of coating.

Further aspects and advantages will be apparent to those of ordinary skill in the art from a review of the following detailed description. While the methods and compositions are susceptible of embodiments in various forms, the description hereafter includes specific embodiments with the understanding that the disclosure is illustrative, and is not intended to limit the disclosure to the specific embodiments described herein.

DETAILED DESCRIPTION

The disclosure provides a fibrous panel including a basemat and a porous veil disposed on at least one side of the basemat, the veil having a first surface in contact with the one side of the basemat and a second facing surface opposite the first surface, wherein a patterned coating including defined areas without any coating and defined areas with at least a single layer of coating is disposed on the second facing surface of the veil.

Advantageously, fibrous panels of the disclosure provide desired light reflectance properties and a non-overlapping finish having uncoated areas which allows sufficient acoustical transmission into and through the panel. By controlling the pattern of the coating provided on the veil, fibrous panels having defined, and reproducible finishes can be prepared and the amount of wasted coating material can be decreased. Further, a substantially monolithic (fully coated) appearing coating can be reproducibly achieved on a fibrous panel while retaining sufficient porosity to allow acoustical transmission through the coating. Currently, when the facing side of a fibrous panel is completely painted to provide a monolithic coating, the coating reflects sound back into the room, negating the designed acoustical properties of the basemat.

As used herein, the terms panel and tile should be considered interchangeable.

Figure 1:
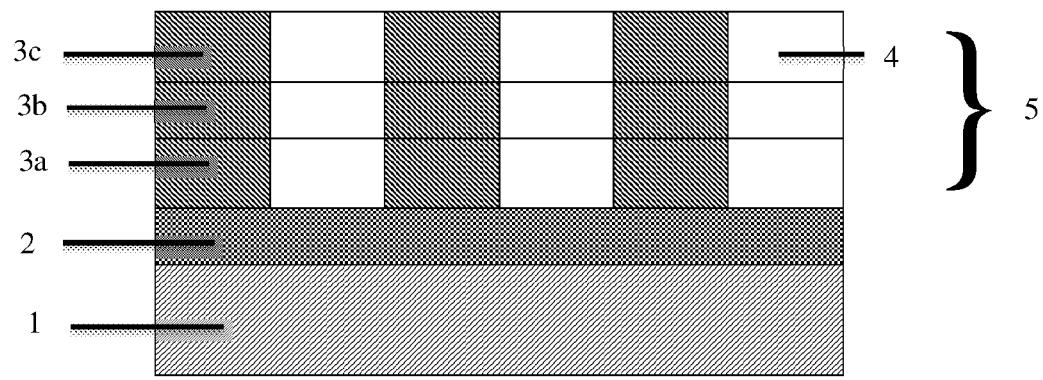
FIG. 1 is a diagram showing a pattern of coating having uncoated areas through which pores native to the veil are accessible.
Figure 2:
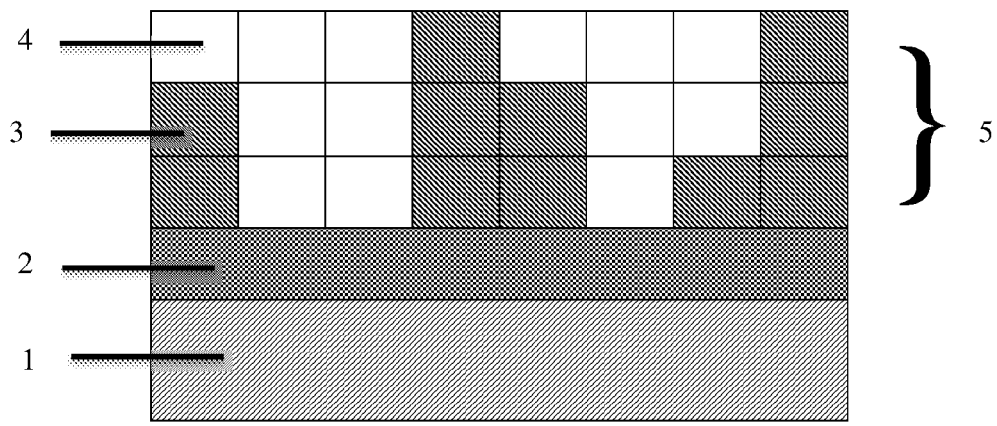
FIG. 2 is a diagram showing a pattern of coating having uncoated areas through which pores native to the veil are accessible.

In embodiments, the defined areas with at least a single layer of coating comprises defined areas with a single layer of coating and defined areas with multiple layers of coating. In embodiments, the defined areas with at least a single layer of coating are arranged to uncoated areas through the patterned coating such that the pores of the porous veil are accessible. As shown in FIGS. 1 and 2, the basemat 1 has a veil 2 disposed on at least one side of the basemat, the veil 2 having a first surface in contact with the one side of the basemat 1 and a second facing surface opposite the first surface, the veil 2 having a patterned coating 5 disposed on the second facing surface, the patterned coating 5 including defined areas without any coating 4 and defined areas with at least one layer of coating 3. As shown in FIG. 1, the patterned coating can be a regularly repeating pattern. Further, as shown in FIG. 1, the patterned coating can be a multilayer coating having a first coating layer 3a, a second coating layer 3b, and a third coating layer 3c. As shown in FIG. 2, the patterned coating can include defined areas without any coating, defined areas with a single layer of coating, and defined areas with multiple layers of coating, for example two or three layers.

Optionally, in embodiments, the patterned coating provides an acoustic transmission of about 20-99%. In embodiments the patterned coating provides a porosity of about 100-2500 l/m$^2$/s, as measured by the air flow porosity test. In embodiments, the patterned coating comprises 0.5 uncoated areas per square foot. Optionally, at least 3% of the surface of the veil is coated with at least a single layer of coating. Further optionally, the pattern of the patterned coating is regularly repeating.

In embodiments, the fibrous panel of any one of the preceding claims, wherein the veil comprises a nonwoven fiberglass or fiberglass blended material. In embodiments, at least one dimension of the defined areas without any coating in the patterned coating disposed on the second facing surface of the veil is larger than the diameter of the pores of the porous veil material. In embodiments, the fibrous panel is a ceiling tile or acoustic absorber.

Another aspect of the disclosure provides a method of making a fibrous panel according to the disclosure, comprising providing a fibrous panel including a basemat and a porous veil disposed on at least one side of the basemat, the veil having a first surface in contact with the one side of the basemat and a second facing surface opposite the first surface, and printing a patterned coating on the second facing surface of the veil, wherein the patterned coating includes defined areas without any coating and defined areas with at least a single layer of coating. In embodiments, the printing includes a printing method selected from the group consisting of offset printing, flexography, inkjet printing, xerography, rotogravure, screen printing, and combinations thereof. In embodiments, the printing comprises offset printing.

Fibrous Panel

The disclosure is directed to a fibrous panel (e.g., an acoustical panel or ceiling tile) having a porous veil, the veil having a first surface in contact with the one side of the fibrous panel and a second facing surface opposite the first surface, and a patterned coating disposed on the second facing surface of the veil. A fibrous panel in accordance with the disclosure comprises a basemat having a backing side and a facing side. The panel comprises a veil in contact with at least the facing side of the panel and a patterned coating on the side of the veil opposite the side in contact with the panel. The backing side of the panel may be the side that is directed to the plenum above the panel in a suspended ceiling tile system. The backing side may alternatively be the side that is directed to a wall behind the panel in applications where an acoustical panel is provided on walls. Thus, as used herein, the terms "facing side" or "facing surface" refer to the side or surface of the panel or veil that is directed toward the center of a room when provided in a suspended ceiling tile system or as an acoustical wall panel.

An illustrative procedure for producing the basemat is described in U.S. Pat. No. 1,769,519. In one aspect, the basemat comprises a mineral wool fiber and a starch. In another aspect of the present disclosure, the starch component can be a starch gel, which acts as a binder for the mineral wool fiber, as is disclosed in U.S. Pat. Nos. 1,769,519, 3,246,063, and 3,307,651. In a further aspect of the present disclosure, the basemat can comprise a glass fiber panel.

The basemat of the fibrous panel of the disclosure can also include a variety of other additives and agents. For example, the basemat can include a calcium sulfate material (such as, stucco, gypsum and/or anhydrite), boric acid and sodium hexametaphosphate (SHMP). Kaolin clay and guar gum may be substituted for stucco and boric acid when manufacturing acoustical tile.

The basemat of the fibrous panel of the present disclosure can be prepared using a variety of techniques. In one embodiment, the basemat is prepared by a wet- or water-felted process, as is described in U.S. Pat. Nos. 4,911,788 and 6,919,132. In another embodiment, the basemat is prepared by combining and mixing starch and a variety of additives in water to provide a slurry. The slurry is heated to cook the starch and create the starch gel, which is then mixed with mineral wool fiber. This combination of gel, additives, and mineral wool fiber (referred to as "pulp") is metered into trays in a continuous process. The bottom of the trays into which the pulp is metered can optionally contain a backing layer (for example, a bleached paper, unbleached paper, or kraft paper-backed aluminum foil, hereinafter referred to as kraft/aluminum foil), which serves to aid in the release of the material from the tray, but also remains as part of the finished product. The surface of the pulp can be patterned, and the trays containing the pulp can be subsequently dried, for example, by transporting them through a convection tunnel dryer. Next, the dried product or slab can be fed into a finishing line, where it may be cut to size to provide the basemat. The basemat can then be converted to the panel of the present disclosure by application of the veil and the patterned coating of the disclosure. In yet another embodiment, the basemat is prepared according to the method described in U.S. Pat. No. 7,364,015, which is incorporated by reference herein. Specifically, the basemat comprises an acoustical layer comprising an interlocking matrix of set gypsum, which can be a monolithic layer or can be a multi-layer composite. Desirably, the basemat is prepared on a conventional gypsum wallboard manufacturing line, wherein a ribbon of acoustical panel precursor is formed by casting a mixture of water, calcined gypsum, foaming agent, and optionally cellulosic fiber (e.g., paper fiber), lightweight aggregate (e.g., expanded polystyrene), binder (e.g., starch, latex), and/or enhancing material (e.g., sodium trimetaphosphate) on a conveyor belt.

In embodiments, the basemat comprises a backing sheet (e.g., paper, metallic foil, or combination thereof), optionally coated with scrim layer (e.g., paper, woven or nonwoven fiberglass) and/or densified layer precursor comprising calcined gypsum and having a density of at least about 35 lbs/ft$^3$. In yet another embodiment, the basemat is prepared according to the wet-felting process. In the wet-felting process, an aqueous slurry of the panel-forming materials including mineral wool, expanded perlite, starch and minor additives, are deposited onto a moving wire screen, such as a Fourdrinier or cylinder former. On the wire screen of a Fourdrinier, a wet mat is formed by dewatering the aqueous slurry by gravity and then optionally by vacuum suction. The wet mat is pressed to a desired thickness between press rolls for additional dewatering. The pressed mat is dried in ovens and then cut to produce acoustical panels. The basemat can then be converted to the panel of the present disclosure by application of the veil and the patterned coating composition of the disclosure. Generally, the patterned coating is applied after the veil is disposed on at least one side of the basemat, but it is also possible to apply the patterned coating to the veil and then to laminate the veil to the basemat.

In a further embodiment, the basemat can include, as a preservative, one or more formaldehyde-free biocides, as described in U.S. Patent Application Publication 2007/0277948 A1, which is incorporated by reference herein. Suitable formaldehyde-free biocides include 1,2-benzisothiazolin-3-one, available as Proxel® GXL or Proxel® CRL (ARCH Chemicals), Nalcon® (Nalco), Canguard™ BIT (Dow Chemical), and Rocima™ BT 1S (Rohm & Haas). Other isothiazolin-3-ones include blends of 1,2-benzisothiazolin-3-one and 2-methyl-4-isothiazolin-3-one, available as Acticide® MBS (Acti-Chem). Additional isothiazolin-3-ones include 5-chloro-2-methyl-4-isothiazolin-3-one, 2-methyl-4-isothiazoline-3-one, and blends thereof. Blends of 5-chloro-2-methyl-4-isothiazolin-3-one and 2-methyl-4-isothiazoline-3-one are available as Kathon™ LX (Rohm & Haas), Mergal® K14 (Troy Chemical), and Amerstat® 251 (Drew Chemical). Another suitable formaldehyde-free biocide includes zinc 1-hydroxy-2(1H)-pyridinethione, available as Zinc Omadine® (ARCH Chemicals), and is preferably effective in both the dry state and the wet state. Zinc 1-hydroxy-2(1H)-pyridinethione can also be employed with zinc oxide, available as Zinc Omadine® emulsion. Other suitable formaldehyde-free biocides include 2-n-octyl-4-isothiazolin-3-one, available as Kathon™893 and Skane® M-8 (Rohm & Haas), and 2-(4-thiazolyl)-benzimidazole, available as Metasol® TK-100 (LanXess).

As previously discussed, the fibrous panel in accordance with the present disclosure can optionally include a backing layer. Numerous materials can be employed as the backing layer, including unbleached paper, bleached paper, kraft/ aluminum foil, and the like. A flame resistant back coating optionally can be applied in combination with bleached or unbleached paper backing to improve the products surface burning characteristics. The flame resistant back coating can include a variety of components, such as, for example, water, a flame retardant, and a biocide. The backing layer may also be employed for improving sag resistance and/or sound control. In addition, a fill coating or a plurality of fill coatings may also be applied to the backing layer. The fill coating can include a variety of components, such as, for example, water, fillers, binders, and various other additives, such as defoamers, biocides, and dispersants.

The basemat to which a veil and a patterned coating on the veil is applied is suitably any fibrous panel (e.g., an acoustical panel or ceiling tile) known in the art and prepared by methods known in the art, including acoustical panels prepared by a water-felting method. Suitable commercial ceiling tiles for use in accordance with the present disclosure include, for example, Radar™ brand ceiling tiles available from USG Interiors, Inc. of Chicago, Ill. The Radar™ brand tile is a water-felted slag wool or mineral wool fiber panel having a ⅝" thickness and the following composition: 1-75 wt. % slag wool fiber, 5-75 wt. % expanded perlite, 1-25 wt. % cellulose, 5-15 wt. % starch, 0-15 wt. % kaolin, 0-80 wt. % calcium sulfate dehydrate, less than 2 wt. % limestone or dolomite, less than 5 wt. % crystalline silica, and less than 2 wt. % vinyl acetate polymer or ethylene vinyl acetate polymer. The diameters of the mineral wool fibers vary over a substantial range, e.g., 0.25 to 20 microns, and most of the fibers are in the range of 3 to 4 microns in diameter. The lengths of the mineral fibers range from about 1 mm to about 8 mm. For example, acoustical panels and the preparation thereof are described in, for example, U.S. Pat. Nos. 1,769,519, 3,246,063, 3,307,651, 4,911,788, 6,443,258, 6,919,132, and 7,364,015, each of which is incorporated herein by reference. The basemat may have any suitable porosity to achieve the required acoustic performance, for example, a porosity in a range of about 100 $l/m^2/s$ to about 2500 $l/m^2/s$, about 500 $l/m^2/s$ to about 2000 $l/m^2/s$, about 1000 $l/m^2/s$ to about 1500 $l/m^2/s$, about 100 $l/m^2/s$ to about 1500 $l/m^2/s$, about 500 $l/m^2/s$ to 1000 $l/m^2/s$, about 1000 $l/m^2/s$ to about 2500 $l/m^2/s$, or about 1500 $l/m^2/s$ to about 2000 $l/m^2/s$.

Veil

Suitable porous veil materials are known in the art. In embodiments, the veil comprises a porous, non-woven fiberglass or fiberglass blended material. The veil may be a non-woven, short or medium strand, continuous fiberglass type material that has a multi-directional and random, overlapping fibrous orientation which allows for significant air permeability and flow in all of its directions. The pores of the veil material may have a pore diameter in a range of about 0.001 mm to about 1.5 mm, about 0.01 mm to about 1.5 mm, about 0.1 mm to about 1.5 mm, about 0.5 mm to about 1.5 mm, about 1 mm to about 1.5 mm, about 0.001 mm to about 1 mm, about 0.01 mm to about 1 mm, about 0.1 mm to about 1 mm, about 0.5 mm to about 1 mm, about 0.001 mm to about 0.5 mm, about 0.001 mm to about 0.1 mm, or about 0.001 mm to about 0.01 mm. The veil may have suitable porosity to allow airflow and acoustic transmission to the basemat. For example, the veil may have a porosity in a range of 100 to about 2500 $l/m^2/s$.

Patterned Coating

The fibrous panels of the disclosure include a veil, wherein the veil has a patterned coating disposed on a facing side of the veil. The patterned coating includes defined areas without any coating and further includes defined areas with at least a single layer of coating. In embodiments, the defined areas with at least a single layer of coating comprises defined areas with a single layer of coating and defined areas with multiple layers of coating. The defined areas with a single layer of coating and/or the defined areas with multiple layers of coating are arranged to provide uncoated areas such that the pores of the porous veil are accessible. The uncoated areas through the patterned coating provide acoustic transmission and air flow through the patterned coating and into and through the veil layer and ultimately into and through the basemat itself.

Prior art methods of coating a veil on a fibrous panel, such as spray coating, provide random areas without any coating, random areas with a single layer of coating, and/or random areas with multiple layers of coatings. Thus, the amount of coating provided, and the amount of uncoated areas through the coating varies from panel to panel and a defined acoustic transmission and air flow resistance cannot be reproduced from panel to panel. Further, the determination of when enough coating has been added to provide a monolithic appearing coating is determined by visual inspection on a panel by panel basis. By providing a patterned coating according to the disclosure, with defined areas having no coating and defined areas with at least a single layer of coating, such as through printing the coating on the veil, the size, number, and pattern (arrangement) of the uncoated areas can be advantageously and reproducibly controlled to provide a defined acoustic transmission through the coating, air flow through the coating, and/or a monolithic appearing coating that can be reproduced from panel to panel.

The acoustic transmission of a fibrous panel can be determined according to ASTM E1414 (CCAC test). The acoustic absorption of a fibrous panel can be determined according to ASTM C423. The air flow can be determined according to the air flow porosity test, ASTM D737. The air flow porosity test is based on constant pressure of air coming through the veil. As the coating is applied, the resistance increases as the defined areas with no coating decrease in size and/or amount.

The acoustic transmission and/or air flow can be varied by varying the amount of uncoated areas per square foot of the veil, varying the amount of the veil surface that is coated with at least a single layer of coating, and/or varying the diameter of the uncoated areas provided in the coating. In embodiments, the patterned coating comprises 0.05 to about 0.5, or about 0.1 to about 0.4, or about 0.1 to about 0.2, for example, about 0.05, about 0.1, about 0.2, about 0.3, about 0.4, or about 0.5 uncoated areas per square foot. In embodiments, at least 3% of the surface area of the facing surface of the veil is coated with at least a single layer of coating and up to about 92% of the surface area of the facing surface of the veil is coated with at least a single layer of coating, for example, about 3% to about 92%, or about 3% to about 90%, or about 5% to about 85%, or about 10% to about 80%, or about 15% to about 75%, or about 20% to about 70%, or about 30% to about 70%, or about 40% to about 60%, or about 45% to about 55%, or about % to about 50%, or about 5% to about 45%, or about 10% to about 40%, or about 20% to about 40%, or about 25% to about 35%, or about 50% to about 92%, or about 55% to about 90%, or about 60% to about 85%, or about 65% to about 85%, or about 70% to about 80%. Optionally, in any embodiments, the pattern of the patterned coating is regularly repeating. The ability to reduce sound transmission is measured by the values of Ceiling Attenuation Class ("CAC") as described in ASTM E1414. CAC value is measured in decibels and represents the amount of sound reduction when sound is transmitted through the material. For example, an acoustical panel with a CAC of 25 reduces transmitted sound by 25 decibels. In embodiments, the patterned coating provides an acoustic transmission loss of about 24 to about 36 CAC, for example, about 26 to about 34 CAC, about 28 to about 32 CAC, about 29 to about 31 CAC, about 24 to about 30 CAC, about 24 to about 28 CAC, about 28 to about 36 CAC, about 30 to about 34 CAC, or about 31 to about 33 CAC. In embodiments, the patterned coating provides an air flow porosity of about 100-2500 l/m$^2$/s, as measured by the air flow porosity test, ASTM D737. In embodiments, the patterned coating provides an acoustic transmission loss of about 24 to about 36 CAC and an air flow porosity of about 100-2500 l/m$^2$/s, as measured by the air flow porosity test. Sound absorption is typically measured by its Noise Reduction Coefficient ("NRC") as described in ASTM C423. The NRC value is an average of four sound absorption coefficients of the particular surface at frequencies of 250 Hz, 500 Hz, 1000 Hz and 2000 Hz, which cover the range of typical human speech. NRC represents the fraction of sound reaching the panel that is absorbed. An acoustical panel with an NRC value of 0.6 absorbs 60% of the sound that strikes it and deflects 40% of the sound. In embodiments, the patterned coating provides an acoustic absorption of about 0.55 to about 1.2 NRC, as measured by ASTM C423, for example, about 0.6 to about 1.1 NRC, about 0.7 to about 1.0 NRC, about 0.8 to about 1.0 NRC, about 0.55 to about 0.9 NRC, about 0.6 to about 0.85 NRC, about 0.65 to about 0.8 NRC, about 0.7 to about 0.75 NRC, about 0.8 to about 1.2 NRC, about 0.9 to about 1.1 NRC, or about 0.95 to about 1.05 NRC.

In embodiments, the diameters of the uncoated areas through the coating are larger than the diameter of the pores of the porous veil material. The uncoated areas through the coating may have a diameter in a range of about 0.5 mm to about 5.0 mm, or about 0.5 mm to about 3.0 mm, for example, about 0.5 mm, about 1.0 mm, about 1.5 mm, about 2.0 mm, about 2.5 mm, about 3.0 mm, about 3.5 mm, about 4.0 mm, about 4.5 mm, or about 5.0 mm.

Methods

The disclosure is further directed to a method of making a fibrous panel according to the disclosure. The method of making a fibrous panel according to the disclosure may comprise providing a fibrous panel including a basemat and a porous veil disposed on at least one side of the basemat, the veil having a first surface in contact with the one side of the basemat and a second facing surface opposite the first surface, and printing a patterned coating on the second facing surface of a veil having a first surface in contact with at least one side of a basemat wherein the patterned coating includes defined areas without any coating and defined areas with at least a single layer of coating. In particular, the printing may be selected from the group consisting of offset printing, flexography, inkjet printing, xerography, rotogravure, screen printing, and combinations thereof. In embodiments, the printing comprises offset printing.

The patterned coating is achieved by printing a first layer such that the veil has defined areas without any coating and defined areas with a single layer of coating. Additional layers may be coated on the first layer (and/or subsequent) layer(s) such that the resulting coating is a multilayered coating including defined areas without any coating, defined areas with a single layer of coating, and defined areas with multiple layers of coating. By selecting the pattern of each layer, the amount, size, and arrangement of the uncoated areas through the coating can be defined to provide a desired acoustic transmission and/or air flow through the coating. The first layer and subsequent layer(s) may be printed using different printing methods. For example, a first layer may be offset printed and at least one subsequent layer may be inkjet printed. Alternatively, a first layer and all subsequent layers may be printed using the same printing method. For example, a first layer may be offset printed and all subsequent layers may be offset printed. A series of successive coating stations may be used to deposit multiple layers. In general, each layer of coating is able to dry between coating stations and the deposition of subsequent layers. High speeds in excess of 500 fpm may be achieved, resulting in a low cost operation with high precision. Further, the printing process advantageously provides a reduction of wasted material (overspray) and better reproducibility in terms of achieving substantially monolithic appearing panels.

The foregoing description is given for clearness of understanding only, and no unnecessary limitations should be understood therefrom, as modifications within the scope of the disclosure may be apparent to those having ordinary skill in the art.

What is claimed:

1. A fibrous panel comprising:
a basemat and a porous veil disposed on at least one side of the basemat, the veil having a first surface in contact with the one side of the basemat and a second facing surface opposite the first surface, wherein a substantially monolithic appearing patterned coating including defined areas without any coating and defined areas with at least a single layer of coating is disposed on the second facing surface of the veil, wherein the pattern of the substantially monolithic appearing patterned coating is regularly repeating.

2. The panel of claim 1, wherein the defined areas with at least a single layer of coating comprises defined areas with a single layer of coating and defined areas with multiple layers of coating.

3. The fibrous panel of claim 1, wherein the defined areas with at least a single layer of coating are arranged to provide uncoated areas through the patterned coating such that the pores of the porous veil are accessible.

4. The fibrous panel of claim 1, wherein the substantially monolithic appearing patterned coating provides an acoustic absorption of about 0.55 to about 1.2 NRC, as measured by ASTM C423.

5. The fibrous panel of claim 1, wherein the substantially monolithic appearing patterned coating provides an acoustic transmission loss (CAC) of about 24 to about 36, as measured by ASTM E1414.

6. The fibrous panel of claim 1, wherein the substantially monolithic appearing patterned coating provides an air flow resistance of about 100-2500 l/m2/s, as measured by the air flow porosity test, ASTM.

7. The fibrous panel of claim 1, wherein the veil comprises a nonwoven fiberglass material.

8. The fibrous panel of claim 3, wherein at least one dimension of the defined areas without any coating in the patterned coating disposed on the second facing surface of the veil is larger than the diameter of the pores of the porous veil material.

9. The fibrous panel of claim 3, wherein the substantially monolithic appearing patterned coating comprises 0.05 uncoated areas per square foot.

10. The fibrous panel of claim 1, wherein at least 3% of the surface of the veil is coated with at least a single layer of coating.

11. The fibrous panel of claim 1, wherein the fibrous panel is a ceiling tile or acoustic absorber.

12. A method of making a fibrous panel according to claim 1, comprising providing a fibrous panel including a basemat and a porous veil disposed on at least one side of the basemat, the veil having a first surface in contact with the one side of the basemat and a second facing surface opposite the first surface, and printing the substantially monolithic appearing patterned coating on the second facing surface of the veil, wherein the substantially monolithic appearing patterned coating includes defined areas without any coating and defined areas with at least a single layer of coating.

13. The method of claim 12, wherein the printing comprises a printing method selected from the group consisting of offset printing, flexography, inkjet printing, xerography, rotogravure, screen printing, and combinations thereof.

14. The method of claim 12, wherein the printing comprises offset printing.

15. The fibrous panel of claim 1, wherein the defined areas with at least a single layer of coating comprises defined areas with multiple layers of coating.

* * * * *